United States Patent
Tervo et al.

(10) Patent No.: US 12,335,189 B2
(45) Date of Patent: Jun. 17, 2025

(54) MULTIPORT PHASE TRACKING REFERENCE SIGNAL IN RADIO COMMUNICATION

(71) Applicant: Nokia Technologies Oy, Espoo (FI)

(72) Inventors: Oskari Tervo, Oulu (FI); Esa Tiirola, Kempele (FI); Kari Pajukoski, Oulu (FI)

(73) Assignee: NOKIA TECHNOLOGIES OY, Espoo (FI)

(*) Notice: Subject to any disclaimer, the term of this patent is extended or adjusted under 35 U.S.C. 154(b) by 573 days.

(21) Appl. No.: 17/782,532

(22) PCT Filed: Dec. 21, 2020

(86) PCT No.: PCT/FI2020/050860
§ 371 (c)(1),
(2) Date: Jun. 3, 2022

(87) PCT Pub. No.: WO2021/160925
PCT Pub. Date: Aug. 19, 2021

(65) Prior Publication Data
US 2023/0006794 A1    Jan. 5, 2023

Related U.S. Application Data

(60) Provisional application No. 62/976,640, filed on Feb. 14, 2020.

(51) Int. Cl.
*H04W 4/00* (2018.01)
*H04B 7/0413* (2017.01)
*H04L 5/00* (2006.01)

(52) U.S. Cl.
CPC ......... *H04L 5/0051* (2013.01); *H04B 7/0413* (2013.01)

(58) Field of Classification Search
CPC ... H04L 5/0051; H04L 5/0048; H04L 5/0094; H04L 27/26035; H04L 27/2636; H04L 27/26134; H04L 27/2613; H04B 7/0413
(Continued)

(56) References Cited

U.S. PATENT DOCUMENTS

2018/0323933 A1    11/2018    Nam et al.
2019/0296876 A1*   9/2019    Zhang .................. H04L 5/0048
(Continued)

FOREIGN PATENT DOCUMENTS

WO    2017/162903 A1    9/2017
WO    2018/237258 A1    12/2018

OTHER PUBLICATIONS

"New SID: Study on supporting NR from 52.6GHz to 71 Ghz", 3GPP TSG RAN Meeting #86, RP-193259, Agenda: 9.1.1, Intel Corporation, Dec. 9-12, 2019, 3 pages.
(Continued)

*Primary Examiner* — Chuong T Ho
(74) *Attorney, Agent, or Firm* — Robert P. Michal, Esq.; Carter, DeLuca & Farrell LLP

(57) ABSTRACT

Systems, methods, apparatuses, and computer program products for multiport phase tracking reference signal in radio communication. A method may include receiving a radio resource control signaling and/or scheduling information from a network element. The method may also include determining a phase tracking reference signal configuration based on the radio resource control signaling and/or scheduling information. The method may further include carrying out a multiport radio reception or transmission with the network element according to the determined phase tracking reference signal configuration.

4 Claims, 11 Drawing Sheets

(58) Field of Classification Search
USPC .................................................. 370/329, 330
See application file for complete search history.

(56) References Cited

U.S. PATENT DOCUMENTS

| | | | | |
|---|---|---|---|---|
| 2020/0008270 | A1* | 1/2020 | Zhang | H04L 27/261 |
| 2020/0022135 | A1* | 1/2020 | Zhang | H04B 17/104 |
| 2020/0022172 | A1* | 1/2020 | Sun | H04L 5/0082 |
| 2020/0052944 | A1* | 2/2020 | Zhang | H04L 5/0007 |
| 2020/0076647 | A1* | 3/2020 | Zhang | H04L 1/0003 |
| 2020/0162216 | A1* | 5/2020 | Yang | H04L 5/0051 |
| 2020/0259609 | A1* | 8/2020 | Saito | H04L 27/2675 |
| 2020/0374017 | A1* | 11/2020 | Dou | H04L 5/0053 |
| 2020/0374060 | A1* | 11/2020 | Wang | H04L 25/0204 |
| 2021/0105166 | A1* | 4/2021 | Khoshnevisan | H04W 8/24 |
| 2022/0385427 | A1* | 12/2022 | Frenne | H04L 5/0048 |

OTHER PUBLICATIONS

"New WID on Extending current NR operation to 71 GHz", 3GPP TSG RAN Meeting #86, RP-193229, Agenda: 9.1.1, Qualcomm, Dec. 9-12, 2019, 5 pages.

"3rd Generation Partnership Project; Technical Specification Group Radio Access Network; NR; Physical channels and modulation (Release 15)", 3GPP TS 38.211, V15.6.0, Jun. 2019, pp. 1-97.

"3rd Generation Partnership Project; Technical Specification Group Radio Access Network; NR; Physical layer procedures for data (Release 15)", 3GPP TS 38.214, V15.3.0, Sep. 2018, pp. 1-96.

"3rd Generation Partnership Project; Technical Specification Group Radio Access Network; Study on new radio access technology: Radio Frequency (RF) and co-existence aspects (Release 14)", 3GPP TR 38.803, V14.2.0, Sep. 2017, pp. 1-205.

"3rd Generation Partnership Project; Technical Specification Group Radio Access Network; Study on supporting NR from 52.6 GHz to 71 GHz (Release 17)", 3GPP TR 38.808, V0.2.0, Nov. 2020, 156 pages.

"Required changes to NR using existing DL/UL NR waveform", 3GPP TSG RAN WG1 #103, R1-2007926, Agenda: 8.2.1, Nokia, Oct. 26-Nov. 13, 2020, 41 pages.

International Search Report and Written Opinion received for corresponding Patent Cooperation Treaty Application No. PCT/FI2020/050860, dated Jun. 4, 2021, 16 pages.

"On the PTRS design for NR", 3GPP TSG RAN WG1 NR Ad-Hoc Meeting, R1-1701105, Agenda: 5.1.2.3.3, Nokia, Jan. 16-20, 2017, 16 pages.

"Discussion on PT-RS design", 3GPP TSG RAN WG1 Nr Ad-Hoc#2, R1-1710777, Agenda: 5.1.2.4.4, CMCC, Jun. 27-30, 2017, pp. 1-9.

Qi et al., "On the Phase Tracking Reference Signal (PT-RS) Design for 5G New Radio (NR)", IEEE 88th Vehicular Technology Conference (VTC-Fall), Aug. 27-30, 2018, 5 pages.

"5G; NR; Radio Resource Control (RRC); Protocol specification (3GPP TS 38.331 version 15.8.0 Release 15)", ETSI TS 138 331, V15.8.0, Jan. 2020, 527 pages.

* cited by examiner

MULTIPORT PHASE TRACKING REFERENCE SIGNAL IN RADIO COMMUNICATION

RELATED APPLICATION

This application was originally filed as PCT Application No. PCT/FI2020/050860 on Dec. 21, 2020, which claims priority from U.S. Application No. 62/976,640, filed on Feb. 14, 2020, each of which is incorporated herein by reference in its entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain example embodiments may relate to apparatuses, systems, and/or methods for multiport phase tracking reference signal (PTRS) in radio communication.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G is mostly built on a new radio (NR), but the 5G (or NG) network can also build on E-UTRAN radio. It is estimated that NR will provide bitrates on the order of 10-20 Gbit/s or higher, and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) are named gNB when built on NR radio and named NG-eNB when built on E-UTRAN radio.

SUMMARY

Some example embodiments are directed to a method. The method may include receiving a radio resource control signaling and/or scheduling information from a network element. The method may also include determining a phase tracking reference signal configuration based on the radio resource control signaling and/or scheduling information. The method may further include carrying out a multiport radio reception or transmission with the network element according to the determined phase tracking reference signal configuration.

Other example embodiments are directed to an apparatus that may include at least one processor and at least one memory including computer program code. The at least one memory and the computer program code are configured, with the at least one processor to cause the apparatus at least to receive a radio resource control signaling and/or scheduling information from a network element. The apparatus may also be caused to determine a phase tracking reference signal configuration based on the radio resource control signaling and/or scheduling information. The apparatus may further be caused to carry out a multiport radio reception or transmission with the network element according to the determined phase tracking reference signal configuration.

Other example embodiments are directed to an apparatus. The apparatus may include means for receiving a radio resource control signaling and/or scheduling information from a network element. The apparatus may also include means for determining a phase tracking reference signal configuration based on the radio resource control signaling and/or scheduling information. The apparatus may further include means for carrying out a multiport radio reception or transmission with the network element according to the determined phase tracking reference signal configuration.

In accordance with other example embodiments, a non-transitory computer readable medium may be encoded with instructions that may, when executed in hardware, perform a method. The method may include receiving a radio resource control signaling and/or scheduling information from a network element. The method may also include determining a phase tracking reference signal configuration based on the radio resource control signaling and/or scheduling information. The method may further include carrying out a multiport radio reception or transmission with the network element according to the determined phase tracking reference signal configuration.

Other accordance with other example embodiments, a non-transitory computer readable medium may be encoded with instructions that may, when executed in hardware, perform a method. The method may include receiving a radio resource control signaling and/or scheduling information from a network element. The method may also include determining a phase tracking reference signal configuration based on the radio resource control signaling and/or scheduling information. The method may further include carrying out a multiport radio reception or transmission with the network element according to the determined phase tracking reference signal configuration.

Other example embodiments may be directed to an apparatus that may include circuitry configured to receive a radio resource control signaling and/or scheduling information from a network element. The apparatus may also include circuitry configured to determine a phase tracking reference signal configuration based on the radio resource control signaling and/or scheduling information. The apparatus may further include circuitry configured to carry out a multiport radio reception or transmission with the network element according to the determined phase tracking reference signal configuration.

Certain example embodiments may be directed to a method. The method may include determining a phase tracking reference signal configuration for at least one single carrier symbol. The method may also include sending the phase tracking reference signal configuration to a user equipment via a related radio resource control signaling and/or scheduling information. The method may further include carrying out a multiport radio transmission or reception with the user equipment according to the phase tracking reference signal configuration. In certain example embodiments, the phase tracking reference signal configuration may be defined according to a transmission rank. In some example embodiments, the phase tracking reference signal configuration may include M groups of modulation symbols, each group comprising N modulation symbols.

Other example embodiments may be directed to an apparatus. The apparatus may include at least one processor and at least one memory including computer program code. The at least one memory and computer program code may be configured to, with the at least one processor, cause the apparatus at least to determine a phase tracking reference signal configuration for at least one single carrier symbol. The apparatus may also be caused to send the phase tracking reference signal configuration to a user equipment via a related radio resource control signaling and/or scheduling information. The apparatus may further be caused to carry out a multiport radio transmission or reception with the user equipment according to the phase tracking reference signal configuration. In certain example embodiments, the phase tracking reference signal configuration may be defined according to a transmission rank. In some example embodiments, the phase tracking reference signal configuration may include M groups of modulation symbols, each group comprising N modulation symbols.

Other example embodiments may be directed to an apparatus. The apparatus may include means for determining a phase tracking reference signal configuration for at least one single carrier symbol. The apparatus may also include means for sending the phase tracking reference signal configuration to a user equipment via a related radio resource control signaling and/or scheduling information. The apparatus may further include means for carrying out a multiport radio transmission or reception with the user equipment according to the phase tracking reference signal configuration. In certain example embodiments, the phase tracking reference signal configuration may be defined according to a transmission rank. In some example embodiments, the phase tracking reference signal configuration may include M groups of modulation symbols, each group comprising N modulation symbols.

In accordance with other example embodiments, a non-transitory computer readable medium may be encoded with instructions that may, when executed in hardware, perform a method. The method may include determining a phase tracking reference signal configuration for at least one single carrier symbol. The method may also include sending the phase tracking reference signal configuration to a user equipment via a related radio resource control signaling and/or scheduling information. The method may further include carrying out a multiport radio transmission or reception with the user equipment according to the phase tracking reference signal configuration. In certain example embodiments, the phase tracking reference signal configuration may be defined according to a transmission rank. In some example embodiments, the phase tracking reference signal configuration may include M groups of modulation symbols, each group comprising N modulation symbols.

Other example embodiments may be directed to a computer program product that performs a method. The method may include determining a phase tracking reference signal configuration for at least one single carrier symbol. The method may also include sending the phase tracking reference signal configuration to a user equipment via a related radio resource control signaling and/or scheduling information. The method may further include carrying out a multiport radio transmission or reception with the user equipment according to the phase tracking reference signal configuration. In certain example embodiments, the phase tracking reference signal configuration may be defined according to a transmission rank. In some example embodiments, the phase tracking reference signal configuration may include M groups of modulation symbols, each group comprising N modulation symbols.

Other example embodiments may be directed to an apparatus that may include circuitry configured to determine a phase tracking reference signal configuration for at least one single carrier symbol. The apparatus may also include circuitry configured to send the phase tracking reference signal configuration to a user equipment via a related radio resource control signaling and/or scheduling information. The apparatus may further include circuitry configured to carry out a multiport radio transmission or reception with the user equipment according to the phase tracking reference signal configuration. In certain example embodiments, the phase tracking reference signal configuration may be defined according to a transmission rank. In some example embodiments, the phase tracking reference signal configuration may include M groups of modulation symbols, each group comprising N modulation symbols.

BRIEF DESCRIPTION OF THE DRAWINGS

For proper understanding of example embodiments, reference should be made to the accompanying drawings, wherein.

DETAILED DESCRIPTION

Figure 1:
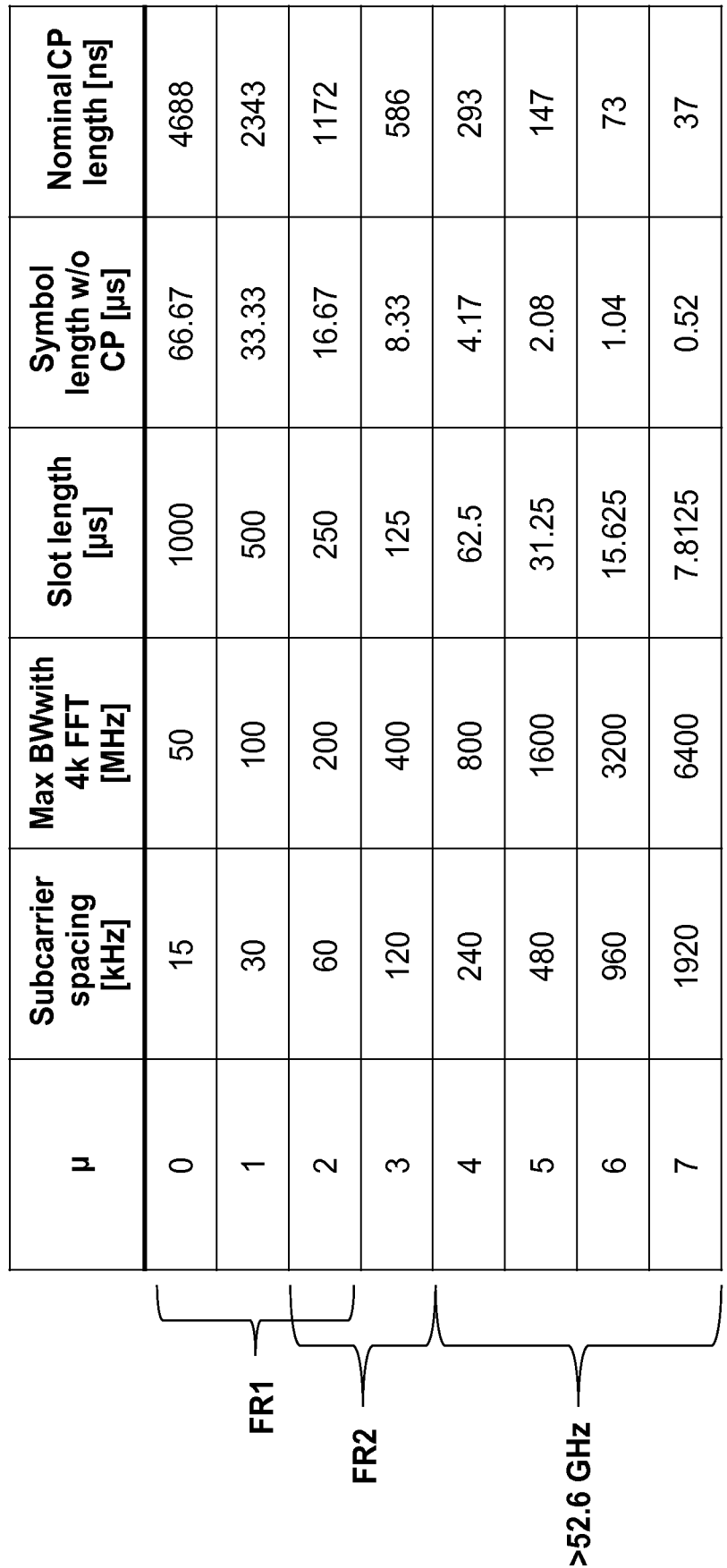
FIG. 1 examples of various numerology candidates for scenarios above 52.6 GHz.

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for multiport phase tracking reference signal (PTRS) for new radio (NR) discrete Fourier transformation (DFT) spread orthogonal frequency division multiplex (DFT-s-OFDM).

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

Certain example embodiments may relate to radio frequency (RF) impairment and/or channel compensation in discrete Fourier transformation (DFT) spread orthogonal frequency division multiplex (DFT-s-OFDM) waveform based new radio (NR) cellular systems operating in cm- or mm-bands (or THz-bands). For instance, certain example embodiments may be related to time-domain phase tracking reference signal (PTRS) designs for the DFT-s-OFDM waveform including, for example, for scenarios above 52.6 GHz. Although certain example embodiments focus on DFT-s-OFDM waveform, the solution can be applied to other single carrier waveforms, such as ZHT-SC-FDM (zero head tail single carrier FDM) or SC-FDE (single carrier frequency domain equalization).

Operation for frequencies up to 52.6 GHz has been defined, and existing physical layer channels have been designed and optimized for scenarios under 52.6 GHz. The frequencies beyond that may contain large spectrum allocations, and may support many high capacity use cases. In addition, 5G NR beyond 52.6 GHz spectrum ranges, use cases, development scenarios, and requirements have been described in 3$^{rd}$ Generation Partnership Project (3GPP).

3GPP study items (SI) assume that the existing downlink/uplink (DL/UL) waveforms may also be used in the 60 GHz band. Although this may be a reasonable assumption for unlicensed band scenarios, for licensed band scenarios, such as licensed band operation at 66-71 GHz, the waveform may become the bottleneck. As such, the design may take into consideration certain aspects including, for example, an efficient transceiver design, including power efficiency and complexity. It may also take into consideration improvement of coverage to cope with extreme propagation loss. Moreover, it may consider inheriting physical layer channel design for frequencies below 52.6 GHz when applicable.

Next generation systems above 52.6 GHz may have to cope with increased path loss, larger antenna arrays, and less efficient RF components such as power amplifiers (PAs), and increased transceiver impairments such as phase noise (PN). Further, increased path loss and low-efficiency RF components may result in limited coverage and, thus, it may be desirable to maximize coverage. Choice of the waveform may have a crucial role in providing sufficient coverage. In this regard, 3GPP Rel-15 supports cyclic prefix (CP) OFDM in DL, and both CP-OFDM and DFT-s-OFDM (also known as single carrier frequency division multiplex (SC-FDM)) in UL (DFT-s-OFDM supports only rank-1 transmission).

Further, DFT-s-OFDM may be supported for coverage-limited scenarios since it may have a lower peak-to-average power ratio (PAPR) and, thus, may provide better coverage. Another benefit of DFT-s-OFDM is that it may use time-domain PTRS, which may be significantly more robust for phase noise than frequency-domain PTRS, which is used in CP-OFDM. As such, DFT-s-OFDM may be a good option for both DL and UL in NR systems operating in carrier frequencies greater than 52.6 GHz.

In NR systems greater than 52.6 GHz, it may be necessary to cope with wide ranges of bandwidth and, thus, multiple subcarrier spacings. NR may provide support for multiple numerologies as shown in Table 1. In particular, Table 1 presents the existing numerologies in 5G NR (below 52.6 GHz), and the numerology may scale higher in >52.6 GHz. For example, as shown in Table 1 (Note: 240 kHz SCS is supported currently only for synchronization signal block (SSB)), larger subcarrier spacing leads to larger carrier bandwidth for a given fast Fourier transform (FFT) size, reduced sensitivity to phase noise, and reduced CP length.

TABLE 1

| Supported Transmission Numerologies | | |
|---|---|---|
| μ | $\Delta f = 2^\mu \cdot 15 [kHz]$ | Cyclic prefix |
| 0 | 15 | Normal |
| 1 | 30 | Normal |
| 2 | 60 | Normal, Extended |
| 3 | 120 | Normal |
| 4 | 240 | Normal |

A bandwidth part (BWP) size of 275 physical resource blocks (PRBs) may be supported in NR Rel-15. Thus, the maximum BWP size according to NR Rel-15 may be 396 MHz (0.12 MHz times12 times 275). However, this is not enough for scenarios above 52.6 GHz where channel bandwidth may be as high as 10 GHz. Additionally, phase noise and the Doppler effect in case the user equipment (UE) is moving may also be increased. Further, larger subcarrier spacings may need to be introduced to address the phase noise, and to provide larger carrier bandwidth with reasonable FFT size. This may be achieved by extending numerology scaling framework defined in NR-Rel 15 to support additional values for μ according to FIG. 1, which illustrates various numerology candidates for scenarios above 52.6 GHz. For example, extending the numerology framework may include features of $2^\mu$ scaling of subcarrier spacing, inverse fast Fourier transformation (IFFT)/FFT block length $2^\mu$, and clock rate $2^\mu$ related to LTE.

At carrier frequencies above 52.6 GHz, oscillator induced PN due to implementation imperfections may become gradually more significant with increasing frequency. In general, PN may increase 6 dB when the carrier frequency is doubled. This may result in severe degradation of detection performance, especially when higher order modulation schemes are used. In other words, this may result in the system not working in scenarios above 52.6 GHz if the PN is not properly taken into account. In addition to oscillator induced PN, time-domain phase variations may also exist due to other phenomena such as frequency drifts due to Doppler shift, or due to insufficient frequency synchronization. Thus, depending on the receiver's operation point, which may be characterized by factors including, for example, carrier frequency, subcarrier spacing, scheduled bandwidth and modulation and coding scheme (MCS), and UE velocity, the phase variation due to any of the above-mentioned effects may require compensation to guarantee successful data transmission.

As described in NR Rel-15/16, UL DFT-s-OFDM may support single port transmission. However, changes may be necessary due to various reasons. For instance, changes may be necessary because single-port transmission is inefficient since there is no support for space-division multiple access (SDMA). This will reduce the achievable data rate and the spectrum efficiency. In addition, SDMA may be a primary multiplexing method over, for example, frequency-division multiple access (FDMA) because the power consumption of digital parts may drive the use of analog RF beamforming. This may result in a single (or very few) RF beam being steered at one time. In addition, SDM may allow for use of lower order modulation for the same rate, resulting in improved coverage compared to higher order modulation needed with FDM. This may be due to the fact that PA output power back-off increases significantly when increasing modulation order. Furthermore, use of higher modulation order may be more limited by PN, which further reduces the coverage. Thus, a way to provide larger throughput and coverage may be to increase transmission rank, and use spatial multiplexing such as multiple-input and multiple-output (MIMO).

Low-PAR transmission mode (i.e., low-order modulations) with spatial multiplexing may be an effective transmission mode in greater than 52.6 GHz UL DFT-s-OFDM. In particular, if the data rate needs to be doubled, the transmission (TX) rank may be doubled or the modulation order may be doubled. Both of these may double the required TX power, but increasing the rank may maintain the PA output power, whereas increasing modulation order may decrease the PA output power (and increase PN impact) and, thus, the coverage. Furthermore, there can also be differences in the link performance. Typically, with certain data rate and BLER operation point, MIMO with a lower modulation and coding scheme may allow for a smaller SNR requirement compared to SIMO using a higher modulation and coding scheme.

Since SDMA may be required to make the system more efficient from the spectrum efficiency and coverage point of view, UL DFT-s-OFDM may need to support both single user (SU)-MIMO and multiuser (MU)-MIMO, and it may be necessary to provide a method to design the PTRS allocations. In certain examples, MU-MIMO may require antenna port specific PTRS since PN is uncorrelated between antenna ports.

With SU-MIMO, the necessity of antenna port specific PTRS may depend on the architecture because the local oscillator (LO) may be common or separate for different antenna ports. Further, architecture based on separate LO (distributed) may require antenna port specific PTRS since PN is uncorrelated between antenna ports, while single-port PTRS may generally be enough with localized (centralized) architectures based on the common LO.

However, even in the centralized case, the minimal interference for the PTRS may need to be guaranteed to obtain reliable estimates. A further issue may be that the system may have to support multiple bandwidths and subcarrier spacings (e.g., bandwidths from 400 MHz to 2 GHz and/or subcarrier spacings from 120 kHz to 3840 kHz). In addition, increased sub-carrier spacing (SCS) means that the effect of PN may be reduced and, thus, less PTRSs may be required to compensate it, and significantly more PTRSs may be required with 120 kHz SCS than with 960 kHz or 3840 kHz. In addition to the number of required PTRSs, optimum time domain pattern may depend on the subcarrier spacing. Thus, certain example embodiments described herein may provide solutions for performing PTRS allocation in cases of when multiport transmission with MU-MIMO or SU-MIMO using centralized or localized architecture is supported for DFT-s-OFDM.

In NR Rel-15, DFT-s-OFDM is supported in UL, and the presence of a PTRS pattern is UE-specifically configurable (i.e., whether it exists or not), and multiple patterns/densities are supported. Furthermore, NR Rel-15/16, provides a description of UL DFT-s-OFDM support for single port transmission. Further, PTRSs may be inserted in groups so that there exists certain number of groups per DFT-s-OFDM symbol, and a certain number of consecutive PTRSs per group.

Figure 2:
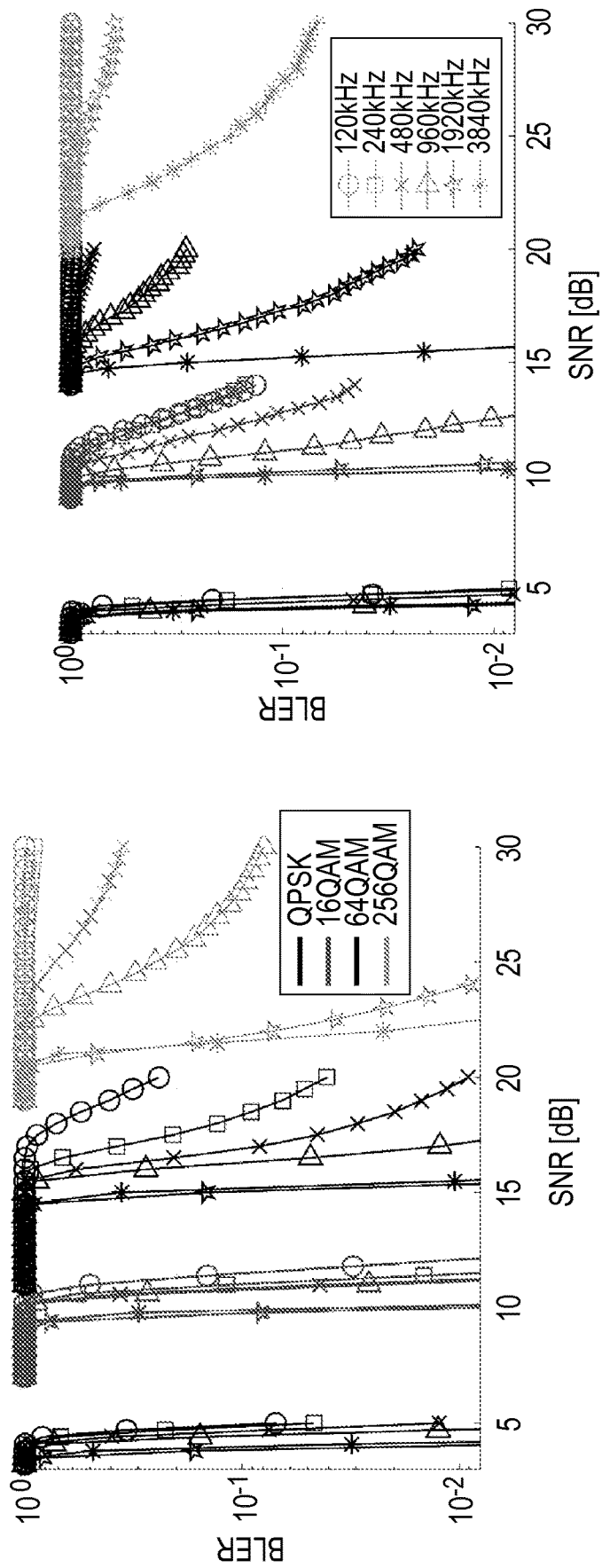
FIG. 2 illustrates an example of discrete Fourier transformation (DFT) spread orthogonal frequency division multiplex (DFT-s-OFDM) (left) and OFDM (right) rank-2 performance in 90 GHz carrier frequency based on new radio (NR) Rel-15 phase tracking reference signal (PTRS).

FIG. 2 illustrates an example of DFT-s-OFDM (left) and OFDM (right) rank-2 performance in 90 GHz carrier frequency based on Rel-15 PTRS. In particular, FIG. 2 illustrates the maximum overhead PTRS configuration in Rel-15, which includes 8 groups per DFT-s-OFDM symbol, and 4 samples per group. As illustrated in FIG. 2, the chosen configuration may be a function of the modulation and coding scheme (MCS) and subcarrier spacing (SCS).

Figure 3:
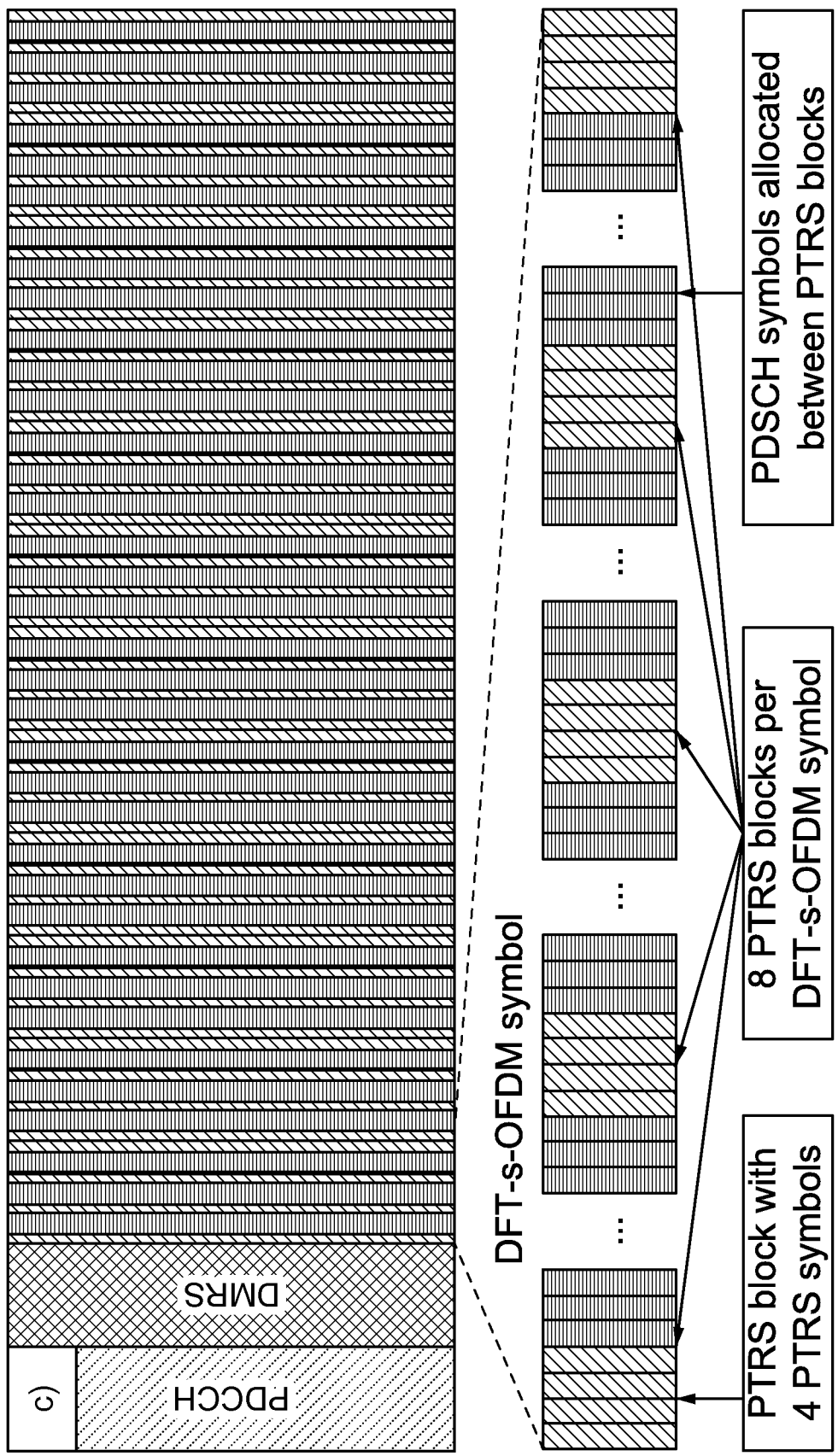
FIG. 3 illustrates an example of a NR Rel-15 PTRS configuration for DFT-s-OFDM.

FIG. 3 illustrates an example of a Rel-15 PTRS configuration for DFT-s-OFDM. When transform precoding is enabled, and if a UE is configured with the higher layer parameter DFT-s-OFDM in PTRS-UplinkConfig, the UE may be configured with the higher layer parameter sampleDensity. The UE may also assume the phase tracking reference signal (PT-RS) antenna ports' presence and PT-RS group pattern are a function of the corresponding scheduled bandwidth in a corresponding BWP. Further, the UE may assume no PT-RS is present when the number of scheduled RBs is less than $N_{RB0}$ if $N_{RB0}>1$, or if the radio network temporary identifier (RNTI) equals temporary cell (TC)-RNTI. In addition, the UE may be configured with PT-RS time density $L_{PT-RS}=2$ with the higher layer parameter timeDensity. Otherwise, the UE may assume $L_{PT-RS}=1$. Further, if the higher layer parameter sampleDensity indicates that the sample density thresholds $N_{RB,i}=N_{RB,i+1}$, then the associated row where both these thresholds appear is disabled. When transform precoding is enabled, and if a UE is configured with the higher layer parameter, DFT-s-OFDM in PTRSUplinkConfig, the PT-RS scaling factor β' may be determined by the scheduled modulation order.

In certain examples, the UE may assume no PT-RS is present when the number of scheduled RBs is less than $N_{RB0}$ if $N_{RB0}>1$, or if the RNTI equals TC-RNTI. In addition, the UE may be configured with PT-RS time density $L_{PT-RS}=2$ with the higher layer parameter timeDensity. Otherwise, the UE may assume $L_{PT-RS}=1$.

An amount of frequency domain PTRS resources depending on MCS or subcarrier spacing has been described. For instance, code division multiplexing (CDM) across the L consequent PT-RS samples in time within a PT-RS burst has been described. This is to separate multiple PT-RS ports of a given UE or multiple PT-RS ports among different MU-MIMO users. However, the subcarrier spacing and/or transmission mode dependent time domain PTRS patterns have not been considered. In other words, it has not been considered how to optimally allocate available resources as a function of subcarrier spacing by taking into account MU-MIMO and SU-MIMO with different transceiver architectures.

NR Rel-15 supports multiple UE-specifically configurable patterns and densities. Thus, a similar approach may be used also for scenarios greater than 52.6 GHz (for rank-1 transmission). However, this approach may result in several challenges. For instance, one challenge is that the system may require a significant amount of signaling related to configurations of optimum patterns for different numerologies. In addition, scenarios above 52.6 GHz may support a wide range of different PHY configuration options, which may require different PTRS approaches. Furthermore, it does not scale to Rank>1 transmission. Another challenge is that there may be high receiver complexity because receiver needs may be separately optimized for different patterns. Further, a third challenge may be due to a complex conformance test since every pattern may need to be tested with every possible subcarrier spacing in order to be sure that the system works as expected.

In view of the above challenges, certain example embodiments may provide a PTRS design for multiport DFT-s-OFDM transmission, which may be efficiently operated with different transmission rank (e.g., MU-MIMO and SU-MIMO with different transmitter architectures), SCS, MCSs, and bandwidths with neither incurring extra signaling overhead nor receiver complexity. In certain example embodiments, several scenarios may be provided including, for example, physical downlink shared channel (PDSCH)/physical uplink shared channel (PUSCH) MU-MIMO/SU-MIMO based on single carrier waveform. According to certain example embodiments, scalable clustered PTRS allocation may be used such that the amount of PTRS symbols varies according to channel rank depending on the MIMO mode.

According to certain example embodiments, a rank dependent PTRS configuration (pattern) may be provided. In an example embodiment, the rank dependent PTRS configuration may be dependent upon the communication scenario. For example, PTRS configuration for rank-1 may be characterized by means of two parameters: M and N (M×N), where M represents the number of PTRS groups per DFT-s-OFDM symbol, and N is the number of PTRS samples (symbols) per group.

Certain example embodiments may provide a design that scales to rank>1, and that can effectively operate with multiple SCSs/MCSs, quality of service (QoS) level, and bandwidths without significant signaling overhead, receiver complexity, or testing efforts. For instance, certain example embodiments may provide PTRS configuration with M×N, and how to use M×N when rank>1 is used since M×N is needed for every antenna port. Certain example embodiments may also scale M and N in a specific manner, and then design CDM to handle the interference. Other example embodiments may provide certain M×N designs depending on SCS/MCS/numerology/rank so that it explicitly depends on those to ultimately provide a simple design.

To support rank>1 transmission, certain example embodiments may define PTRS configuration according to a maximum rank, which may take into account both SU-MIMO and MU-MIMO. For instance, in one example embodiment, the number of resource elements for PTRS (M times N') may be increased with increasing the maximum rank, where N'=rank times N. According to an example embodiment, the increase may be made by determining the number of resource elements in the PTRS group (N') in a way that it supports CDM multiplexing of PTRS antenna ports according to the maximum rank. In certain example embodiments, when max rank=1, N' may be an integer. When max rank=2, N' may be a multiple of 2, and when max rank=4, N' may be a multiple of 4. Furthermore, according to certain example embodiments, the number of PTRS groups (M) may be increased with the increasing maximum rank.

According to an example embodiment, M may be dimensioned such that Rank x (# of bits/modulation symbol) is kept constant (i.e., it does not depend on the maximum rank). For instance, in one example embodiment, for cases with rank>1, M may be defined based on higher order modulation, which may provide similar data rate when using rank 1. For example, according to certain example embodiments, a PTRS dimensioning table (M×N') for certain SCS may be determined for different modulation orders, assuming that baseline M and N are designed for rank-1 (see Table 2).

TABLE 2

| MIMO Dimensioning | | |
|---|---|---|
| Modulation | bits/modulation symbol | M × (N × rank) |
| QPSK | 2 | 8 × (4 × rank) |
| 16QAM | 4 | 12 × (4 × rank) |
| 64QAM | 6 | 14 × (4 × rank) |
| 256QAM | 8 | 24 × (2 × rank) |

From Table 2, MIMO dimensioning for the same SCS may be made so that Rank times (bits/modulation symbol) is kept constant. This would mean: QPSK with Rank=2 (4 bits/symbol) corresponds to case 16 quadrature amplitude modulation (QAM), Rank=1; QPSK with Rank=3 (6 bits/symbol) corresponds to case 64QAM, Rank=2; QPSK with Rank=4 (8 bits/symbol) corresponds to case 256QAM, Rank=1; 16QAM with Rank=2 (8 bits/symbol) corresponds to case 256QAM, Rank=1; 16QAM with Rank=3 (12 bits/symbol) corresponds to case 4096QAM, Rank=1; and 64QAM with Rank=2 (12 bits/symbol) corresponds to case 4096QAM, Rank=1. According to an example embodiment, the maximum value for M times N' (such as M times N'=30×(4×rank)) may be used after certain value (Rank times bits/modulation symbols), for example, after 8 bits/modulation symbol. As such, N' may then scale with the rank as described above. In certain example embodiments, other dimensioning principles between Rank1 and Rank>1 may also be used.

According to certain example embodiments, the UE receiving PTRS may be made aware of the gNB transmitter LO architecture (e.g., centralized or distributed). In an example embodiment, when centralized architecture is used with DL SU-MIMO, the UE may combine PTRS received via different antenna ports for increased PN tracking accuracy (provided that centralized LO architecture is used also at the UE side). In another example embodiment, for cases with rank>1, CDM may be used between the ports to provide orthogonality for different PTRSs. For instance, in one example embodiment, CDM may be realized where consecutive PTRS symbols are multiplied by orthogonal code, such as Hadamard code (or Walsh code). According to an example embodiment, each spatial layer may occupy a predefined orthogonal code, and the first spatial layer (port index=0) may occupy the orthogonal code with "all-ones."

Table 3 shows the orthogonal cover codes according to Hadamard for cases of rank=2 and rank=4, respectively, according to an example embodiment. Table 3 also shows one example of how the method may scale with the rank. For instance, in this example, N=1 may denote the PTRS group size for a rank=1 case, and N'=N times rank.

TABLE 3

Orthogonal Cover Codes

| port index | rank = 2<br>N' = 2<br>[w(0) w(1)] | rank = 4<br>N' = 4<br>[w(0) w(1) w(2) w(3)] |
|---|---|---|
| 0 | [+1 +1] | [+1 +1 +1 +1] |
| 1 | [+1 −1] | [+1 −1 +1 −1] |
| 2 | — | [+1 +1 −1 −1] |
| 3 | — | [+1 −1 −1 +1] |

According to another example embodiment, if different MCSs are used for different ports (e.g., different users using different modulations in MU-MIMO), PTRS configuration for each port may be defined based on the highest MCS. According to an example embodiment, each port may correspond to every port at the Tx side (and similarly every port at the Rx side). Thus, in certain example embodiments, if there are 4 ports in UL MU-MIMO (e.g., user 1 transmitting with 2 ports, and user 2 transmitting with 2 ports), the PTRS configuration for all these 4 ports may be chosen according to the port which has the highest MCS. Similarly, in other example embodiments, the gNB may know that PTRS configuration is defined based on the highest MCS. In another example embodiment, the PTRS configuration may be determined based on the number of PRBs of the scheduled data. According to a further example embodiment, the rank dependent PTRS configuration may depend on the SCS and MCS. In other example embodiments, in addition to parameters M and N (or N'), another parameter L may indicate the time density in DFT-s-OFDM symbols. For instance, parameter L may indicate whether PTRS exists in all DFT-s-OFDM symbols or only some of them. L may also indicate that PTRS exists in each DFT-s-OFDM symbol, every second DFT-s-OFDM symbol, or every third DFT-s-OFDM symbol.

Figure 4:
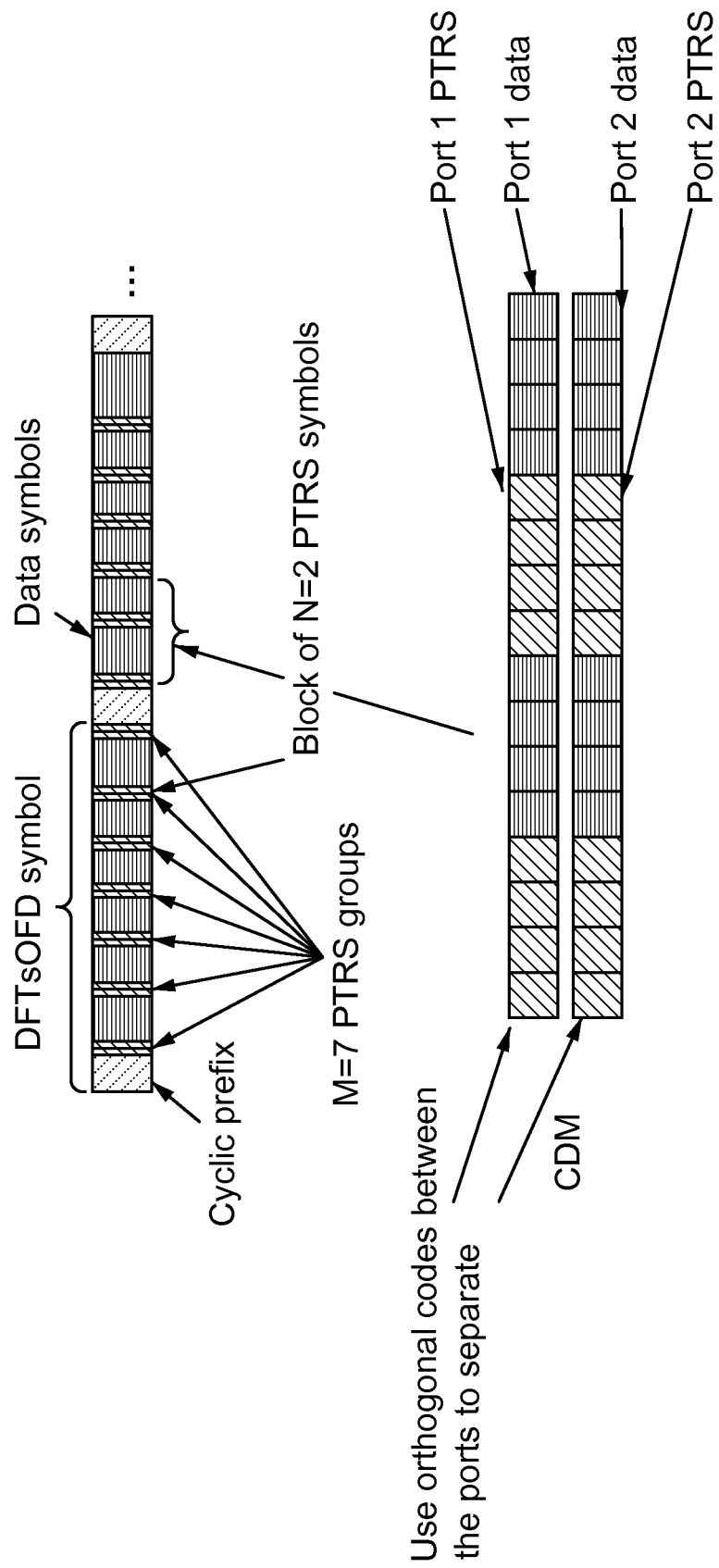
FIG. 4 illustrates a PTRS configuration, according to an example embodiment.

FIG. 4 illustrates a configuration of a PTRS, according to an example embodiment. In particular, FIG. 4 illustrates an M×N PTRS structure for DFT-s-OFDM symbol (top), and an example of the mapping to a rank-2 case (bottom). As illustrated in FIG. 4, the positions of groups may be optimized and designed based on e.g., numerology and transmission mode, and not all the groups need to be of the same size.

FIGS. 5(*a*)-5(*c*) illustrate dimensioning of M for different subcarrier spacings, according to an example embodiment. According to certain example embodiments, linkage between the PTRS configuration and the scheduled data may be made such that link performance can be optimized for the considered scenario. For instance, in one example embodiment, the scenario may relate to performance degradation due to PN, which may be kept at a reasonable level while minimizing overhead due to PTRS. This may be achieved by means of at least the following: M increases when RANK increases; N' increases when RANK increases; M increases when SCS decreases (DFT-s-OFDM symbol length increases); M increases when nPRB increases; and M increases when MCS increases.

Figure 6:
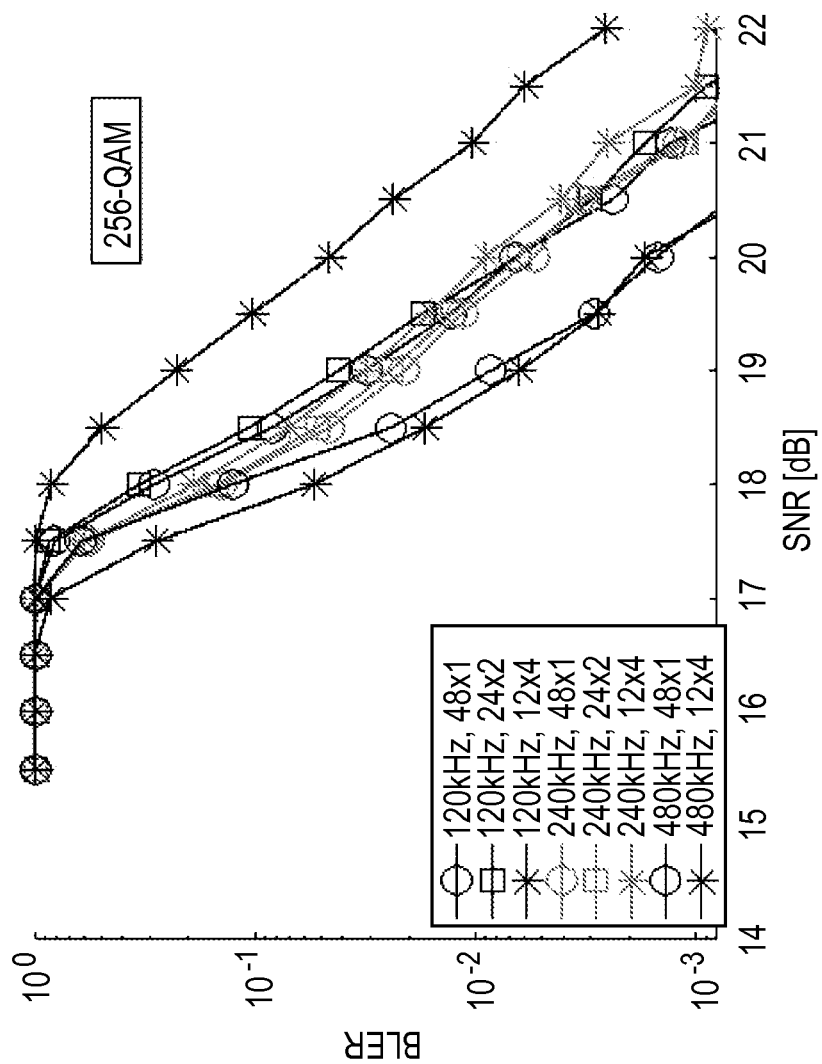
FIG. 6 illustrates an example of a performance of different M×N configurations for different sub-carrier spacing (SCS), according to an example embodiment.

FIG. 6 illustrates an example of a performance of different M×N configurations for different SCS, when assuming fixed PTRS overhead (i.e., M×N is fixed), according to an example embodiment. According to another example embodiment, for smaller SCS, to keep the PTRS overhead smaller, more groups per DFT-s-OFDM symbol may be used, but less samples per group, while for larger SCS, less groups per DFT-s-OFDM symbol may be used but more samples per group. Performance of this linkage is illustrated in the example of FIG. 6.

According to an example embodiment, the UE may assume the predefined PTRS configuration is based on used numerology, rank, and transmission mode. In an example embodiment, the UE receiving PTRS may be made aware of the gNB transmitter LO architecture including, for example, whether it is centralized or distributed. If the receiving UE has a centralized LO, and it may be made aware that the gNB transmitter is using centralized architecture, it may estimate and combine the PN estimates from different ports to improve the performance. Other example embodiments may support multiple configurations defined for certain numerology so that other configurations may have more samples per group but less groups, and other configurations may have less samples per group but more groups.

Table 4 illustrates a tabulated linkage between PTRS configuration and the scheduled data for rank-1 and rank-2, according to an example embodiment. As illustrated in Table 4, N'=rank times N denotes the scaled group size for rank>1 transmissions. According to one example embodiment, M may scale as previously described herein. In addition, the table may be provided for different number of scheduled PRBs including, for example, with predefined PRB granularity. The table may also be provided for different MCSs, and there may also be any number of defined configurations. In certain example embodiments, the positions of groups may be optimized and designed based on numerology, and not all the groups need to be necessarily of the same size. Further, as illustrated in Table 4, group size N=4 for MCS up to 64-QAM, and N=2 for 256-QAM.

TABLE 4

PTRS configuration examples for certain MCS and nPRB

| MCS<br>SCS | nPRB | QPSK<br>M × N' | 16-QAM<br>M × N' | 64-QAM<br>M × N' | 256-QAM<br>M × N' |
|---|---|---|---|---|---|
| 120 | 2160 | rank-1: 8 × 4<br>rank-2: 12 × 8<br>... | rank-1: 12 × 4<br>rank-2: 24 × 4<br>... | rank-1: 14 × 4<br>rank-2: 18 × 4<br>... | rank-1: 24 × 2<br>rank-2: 26 × 4<br>... |
| 240 | 2160 | rank-1: 8 × 4<br>rank-2: 12 × 8<br>... | rank-1: 12 × 4<br>rank-2: 20 × 4<br>... | rank-1: 12 × 4<br>rank-2: 16 × 4<br>... | rank-1: 20 × 2<br>rank-2: 22 × 4<br>... |
| 480 | 2160 | rank-1: 4 × 4<br>rank-2: 10 × 8<br>... | rank-1: 10 × 4<br>rank-2: 18 × 4<br>... | rank-1: 12 × 4<br>rank-2: 20 × 4<br>... | rank-1: 18 × 2<br>rank-2: 20 × 4<br>... |

TABLE 4-continued

PTRS configuration examples for certain MCS and nPRB

| MCS SCS | nPRB | QPSK M × N' | 16-QAM M × N' | 64-QAM M × N' | 256-QAM M × N' |
|---|---|---|---|---|---|
| 960 | 2160 | rank-1: 4 × 4<br>rank-2: 10 × 8<br>. . . | rank-1: 10 × 4<br>rank-2: 16 × 4<br>. . . | rank-1: 10 × 4<br>rank-2: 18 × 4<br>. . . | rank-1: 16 × 2<br>rank-2: 18 × 4<br>. . . |

According to certain example embodiments, in the case of multiple configurations, one of those may be considered as the default configuration. According to one example embodiment, the default configuration may be determined as a function of carrier frequency. However, in other example embodiments, other configurations may be configured and/or take into use by means of radio resource control (RRC) signaling. According to certain example embodiments, multiple configurations may be determined, for example, according to QoS (e.g., enhanced mobile broadband (eMBB) and ultra-reliable low-latency communications (URLLC)), or block error ratio (BLER) operation point. In an example embodiment, scheduling information such as downlink control information (DCI), may indicate which one of the multiple configurations is used for the current transmission. In another example embodiment, multiple configurations are determined for the case of different MU-MIMO orders: Rank 1 (no MU-MIMO), MU-MIMO with Rank 2, MU-MIMO with Rank 3, MU-MIMO with Rank 4. This enables gNB to select the desired PTRS configuration dynamically, and indicate the selection for different UEs paired to operate in different MU-MIMO scheduling scenarios. This is needed since UE part of MU-MIMO scheduling may not otherwise know the MIMO rank.

In certain example embodiments, the UE may know both (maximum) rank used to determine the PTRS configuration, as well as the index for each of the antenna ports. According to an example embodiment, this information may be provided using DCI and/or higher layer configuration.

Figure 5B:
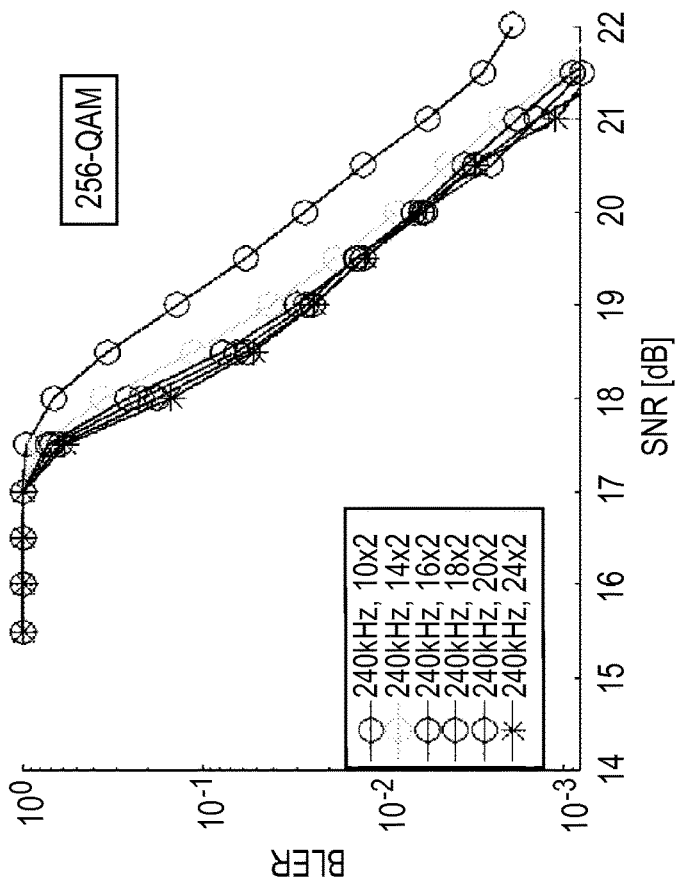
FIG. 5(b) illustrates another dimensioning of a number of PTRS groups per DFT-s-OFDM symbol (M) for different subcarrier spacings, according to an example embodiment.
Figure 5A:
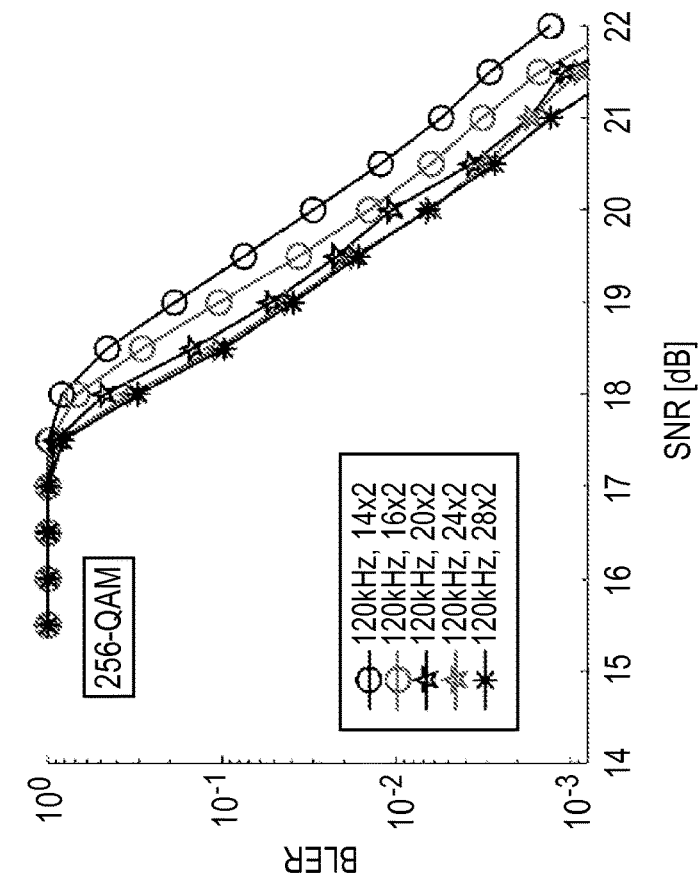
FIG. 5(a) illustrates dimensioning of a number of PTRS groups per DFT-s-OFDM symbol (M) for different subcarrier spacings, according to an example embodiment.
Figure 5C:
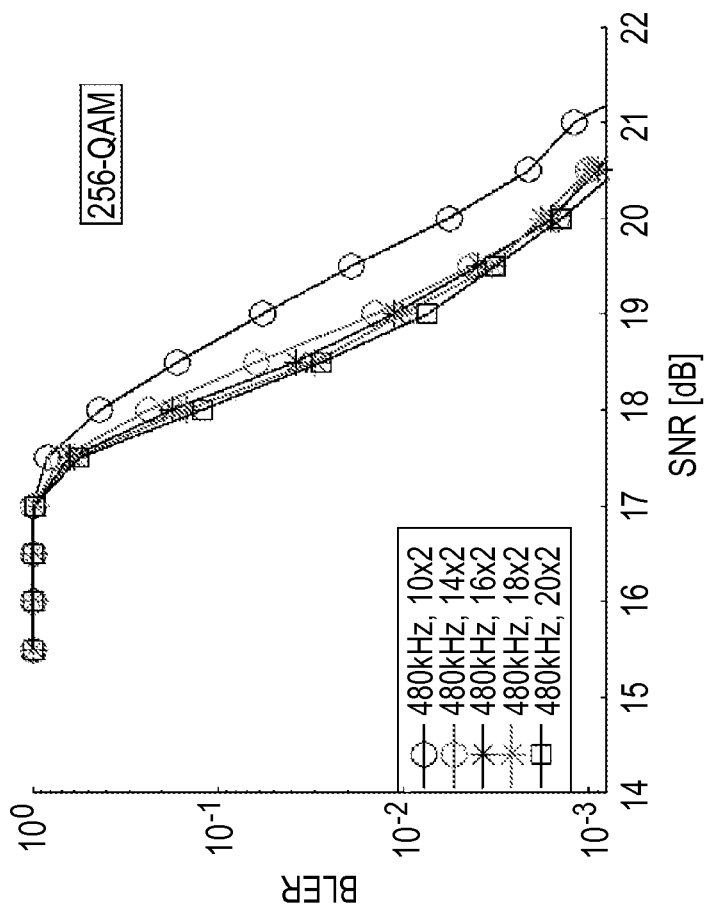
FIG. 5(c) illustrates another dimensioning of a number of PTRS groups per DFT-s-OFDM symbol (M) for different subcarrier spacings, according to an example embodiment.

As noted above, FIGS. 5(a)-5(c) illustrate the link performance of 256-QAM as a function of M. As illustrated in FIGS. 5(a)-5(c), for 120 kHz, 24×2 may be enough, while for 240 kHz, 20×2 is enough, and for 480 kHz, 16×2 may be enough. FIGS. 5(a)-5(c) also illustrate an example of the configurations when nPRB=2160→if nPRB=180. In certain example embodiments, the number of PTRS groups may be, for example, half of these.

As noted above, FIG. 6 illustrates a performance of different M×N configurations for different SCS. For instance, FIG. 6 illustrates the performance, where the number of PTRSs per DFT-s-OFDM symbol is fixed to 48. In addition, with 120 kHz, the best performance may be achieved with 48×1, while 12×4 is the worst. On the other hand, with 480 kHz, the best performance may be achieved with 12×4.

Figure 7:
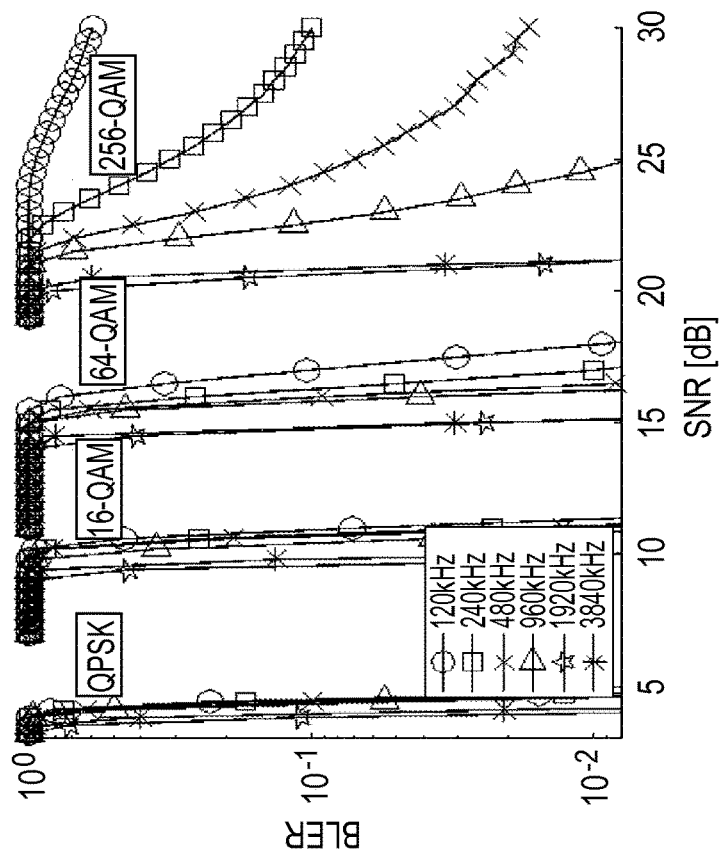
FIG. 7 illustrates an example of a performance of various PTRS patterns, according to an example embodiment.
Figure 7:
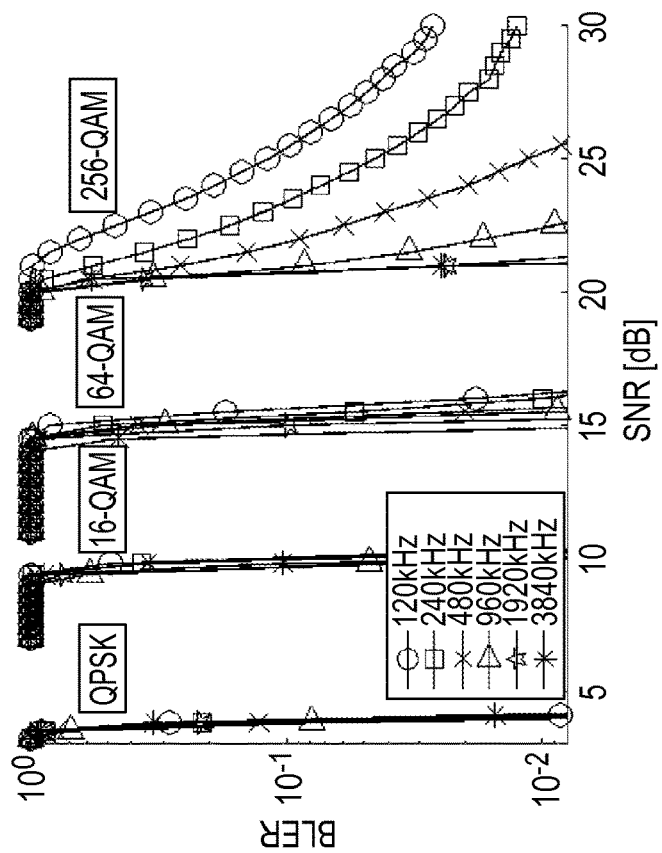

FIG. 7 illustrates an example of the performance of various PTRS patterns, according to an example embodiment. In particular, the left side of FIG. 7 illustrates DFT-s-OFDM rank-2 performance in 60 GHz carrier frequency based on Rel-15 PTRS. On the right, FIG. 7 illustrates a modified PTRS, according to an example embodiment.

Figure 8:
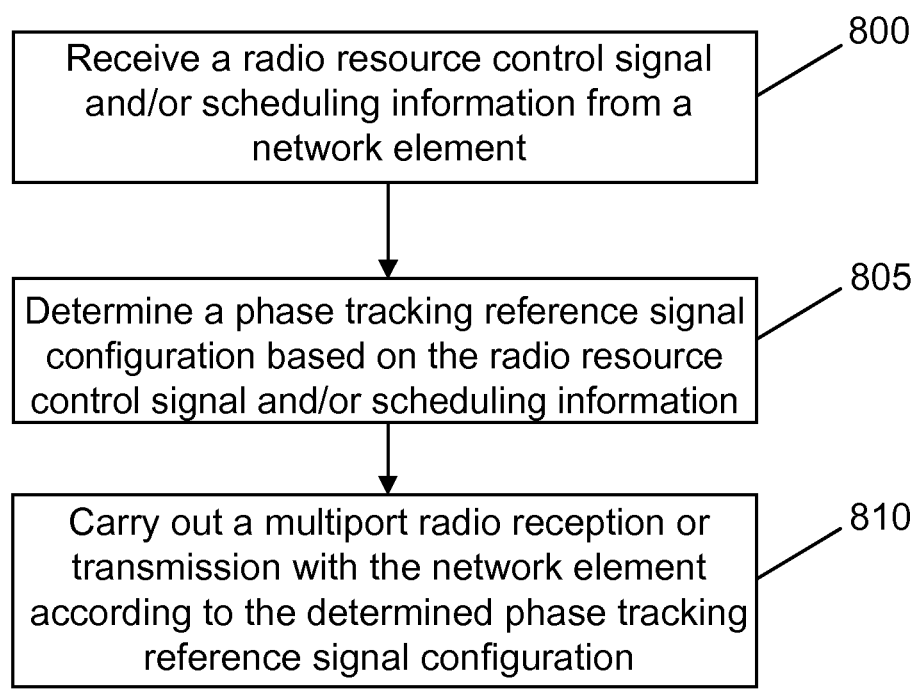
FIG. 8 illustrates a flow diagram of a method, according to an example embodiment.

FIG. 8 illustrates a flow diagram of a method, according to an example embodiment. In certain example embodiments, the flow diagram of FIG. 8 may be performed by a mobile station and/or UE, for instance similar to apparatus 10 illustrated in FIG. 10(a). According to one example embodiment, the method of FIG. 8 may include, at 800, receiving a radio resource control signaling and/or scheduling information from a network element. The method may also include, at 805, determining a phase tracking reference signal configuration based on the radio resource control signaling and/or scheduling information. The method may further include, at 810, carrying out a multiport radio reception or transmission with the network element according to the determined phase tracking reference signal configuration.

According to an example embodiment, the method may further include receiving an indication of a local or partially local oscillator architecture of the network element. According to a further example embodiment, the phase tracking reference signal configuration may be received based on the local or partially local oscillator architecture of the network element. In an example embodiment, the method may further include combining the received phase tracking reference signal configuration via different antenna ports based on the local oscillator architecture when a local oscillator architecture or partially local oscillator architecture is used so that some ports have similar phase noise. In another example embodiment, the multiport radio reception or transmission may be performed with a multi-user multiple-input and multiple-output, or a single user multiple-input and multiple output. In a further example embodiment, the local oscillator architecture may include a distributed architecture, partially distributed architecture, or a centralized architecture. According to an example embodiment, the phase tracking reference signal configuration may be received in a discrete Fourier transformation spread orthogonal frequency division multiplex (DFT-s-OFDM) waveform.

Figure 9:
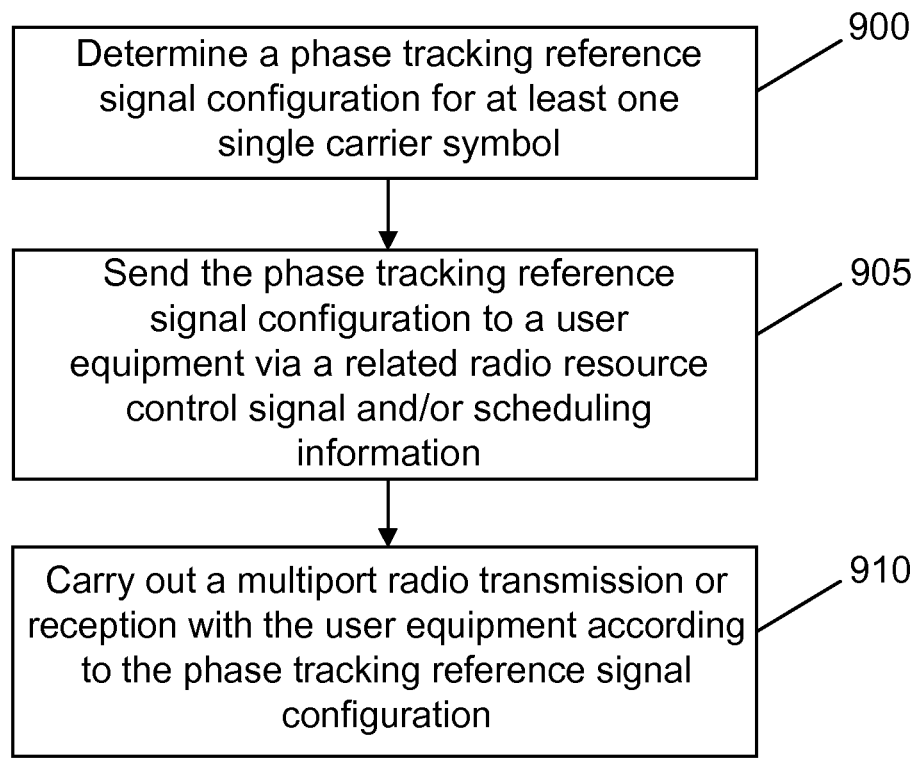
FIG. 9 illustrates a flow diagram of another method, according to an example embodiment.

FIG. 9 illustrates a flow diagram of another method, according to an example embodiment. In an example embodiment, the method of FIG. 9 may be performed by a telecommunications network, network entity or network node in a 3GPP system, such as LTE or 5G-NR. For instance, in an example embodiment, the method of FIG. 9 may be performed by a base station, eNB, or gNB for instance similar to apparatus 20 illustrated in FIG. 10(b).

According to an example embodiment, the method of FIG. 9 may include, at 900, determining a phase tracking reference signal configuration for at least one single carrier symbol. The method may also include, at 905, sending the phase tracking reference signal configuration to a user equipment via a related radio resource control signaling and/or scheduling information. The method may further include, at 910, carrying out a multiport radio transmission or reception with the user equipment according to the phase tracking reference signal configuration. According to an example embodiment, the phase tracking reference signal configuration may be defined according to a transmission rank. According to another example embodiment, the phase tracking reference signal configuration may include M groups of modulation symbols, each group comprising N modulation symbols.

In certain example embodiments, the phase tracking reference signal configuration and an index of an antenna port may be determined with information received via a downlink control information or higher layer configuration. According to an example embodiment, the multiport radio transmission is performed with a multi-user multiple-input and multiple-output, or a single user multiple-input and multiple output. According to another example embodiment, the phase tracking reference signal configuration may be dependent upon a number of physical resource blocks of scheduled data. According to a further example embodiment, the phase tracking reference signal configuration may be dependent upon sub-carrier spacing, and/or a modulation and coding scheme.

In an example embodiment, the phase tracking reference signal configuration may be dependent upon at least one of a transmission rank, quality of service, block error rate, and/or transmission numerology. In another example embodiment, the parameter N may be determined in a manner supporting code division multiplexing of phase tracking reference signal antenna ports according to the transmission rank, and a number of phase tracking reference signal groups (M) may be increased with the increasing transmission rank. According to an example embodiment, the relationship between the transmission rank and N may be if the maximum rank equals 1, N is an integer, if the maximum rank equals 2, N is a multiple of 2, and if the max rank equals 4, N is a multiple of 4. According to another example embodiment, the code division multiplexing may be realized by means of spatial layer-specific Hadamard code. According to a further example embodiment, dimensioning for parameter M may be made such that Rank x (# of bits/modulation symbol) is kept constant.

According to an example embodiment, at least one of M, N, and (M times N) may depend on sub-carrier spacing. According to another example embodiment, at least one of M, N, and (M times N) may depend on a modulation and coding scheme. In an example embodiment, at least one of M, N, and (M times N) may depend on a number of physical resource blocks allocated. In another example embodiment, the phase tracking reference signal configuration may cover one single carrier symbol. According to an example embodiment, M group of modulation symbols may be spread within the at least one single carrier symbol. According to another example embodiment, the user equipment may be configured with multiple phase tracking reference signal patterns, and the user equipment selects one pattern out of the multiple configured patterns based on an indication received via downlink control information. According to a further example embodiment, the multiple phase tracking reference signal patterns correspond to cases with different transmission rank.

Figure 10A:
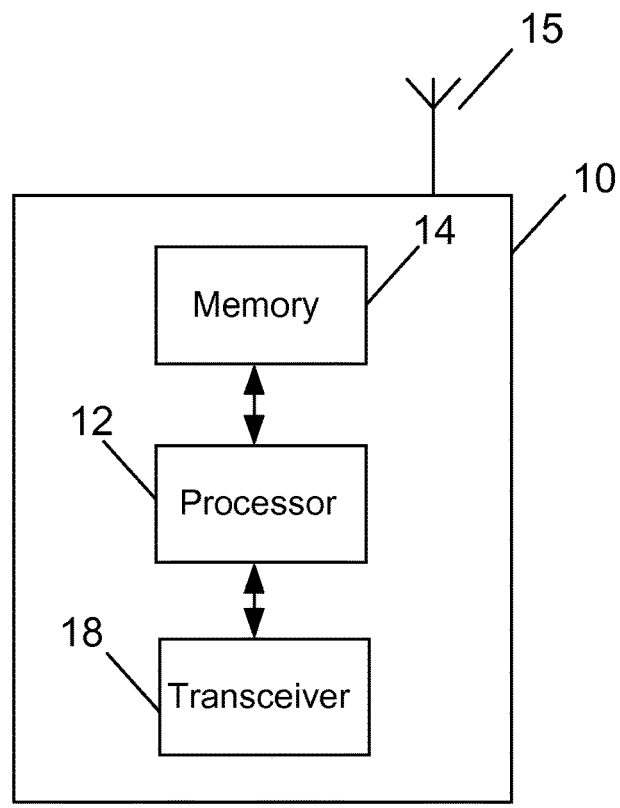
FIG. 10(a) illustrates an apparatus, according to an example embodiment.

FIG. 10(a) illustrates an apparatus 10 according to an example embodiment. In an embodiment, apparatus 10 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device, sensor or NB-IoT device, or the like. As one example, apparatus 10 may be implemented in, for instance, a wireless handheld device, a wireless plug-in accessory, or the like. According to certain example embodiments, UE functionalities could be carried out also by a relay node, such as IAB (integrated access and backhaul) node. More specifically, MT (Mobile Termination) part of the IAB node.

In some example embodiments, apparatus 10 may include one or more processors, one or more computer-readable storage medium (for example, memory, storage, or the like), one or more radio access components (for example, a modem, a transceiver, or the like), and/or a user interface. In some embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 10(a).

As illustrated in the example of FIG. 10(a), apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 10(a), multiple processors may be utilized according to other embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-8.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-8.

In some embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device). In certain embodiments, apparatus 10 may further include a user interface, such as a graphical user interface or touchscreen.

In an embodiment, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to an example embodiment, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some embodiments, transceiver 18 may be included in or may form a part of transceiving circuitry.

As discussed above, according to certain example embodiments, apparatus 10 may be a UE for example. According to certain embodiments, apparatus 10 may be controlled by memory 14 and processor 12 to perform the functions associated with example embodiments described herein. For instance, in one embodiment, apparatus 10 may be controlled by memory 14 and processor 12 to receive a radio resource control signaling and/or scheduling information from a network element. Apparatus 10 may also be controlled by memory 14 and processor 12 to determine a phase tracking reference signal configuration based on the radio resource control signaling and/or scheduling information. Apparatus 10 may further be controlled by memory 14 and processor 12 to carry out a multiport radio reception or transmission with the network element according to the determined phase tracking reference signal configuration. Apparatus 10 may also be controlled by memory 14 and processor 12 to receive an indication of a local or partially local oscillator architecture of the network element. Apparatus 10 may further be controlled by memory 14 and processor 12 to combine the received phase tracking reference signal configuration via different antenna ports based on the local oscillator architecture when a local oscillator architecture or partially local oscillator architecture is used so that some ports have similar phase noise.

Figure 10B:
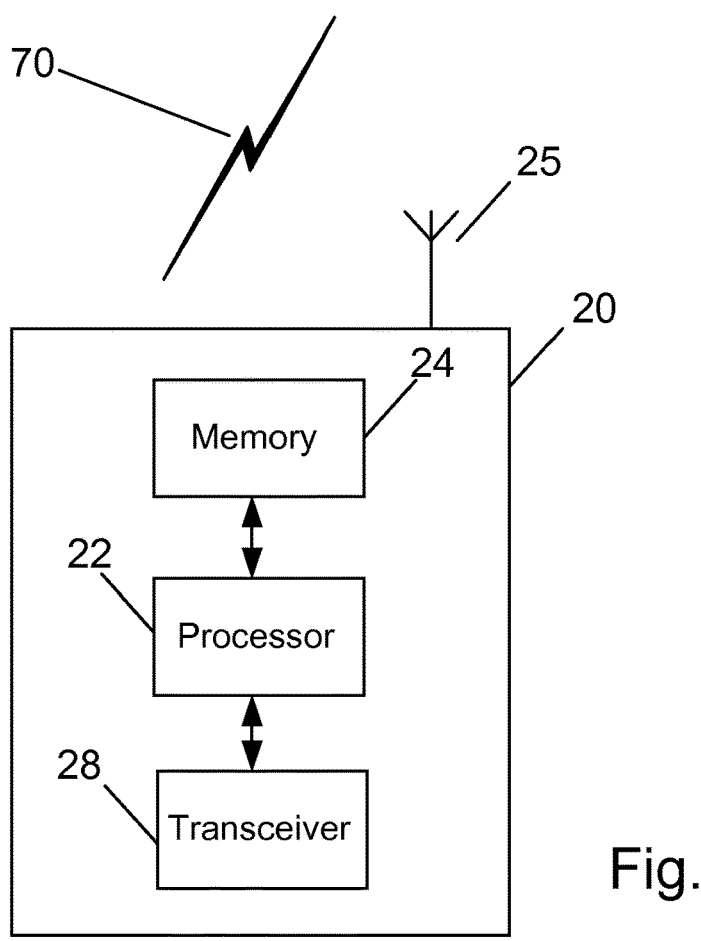
FIG. 10(b) illustrates another apparatus, according to an example embodiment.

FIG. 10(b) illustrates an apparatus 20 according to an example embodiment. In an example embodiment, the apparatus 20 may be a network element, node, host, or server in a communication network or serving such a network. For example, apparatus 20 may be a base station, a Node B, an evolved Node B (eNB), 5G Node B or access point, next generation Node B (NG-NB or gNB), and/or WLAN access point, associated with a radio access network (RAN), such as an LTE network, 5G or NR. According to certain example embodiments, the BS functionalities may be carried out also by a relay node, such as DU (Distributed Unit) part of IAB node. It should be noted that one of ordinary skill in the art would understand that apparatus 20 may include components or features not shown in FIG. 10(b).

As illustrated in the example of FIG. 10(b), apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 10(b), multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster.

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes illustrated in FIGS. 1-7 and 9.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods illustrated in FIGS. 1-7 and 9.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other embodiments, transceiver 18 may be capable of transmitting and receiving signals or data directly. Additionally or alternatively, in some embodiments, apparatus 20 may include an input and/or output device (I/O device).

In an embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some embodiments, processor 22 and memory 24 may be included in or may form a part of processing circuitry or control circuitry. In addition, in some embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 20 may be a network element, node, host, or server in a communication network or serving such a network. For example, apparatus 20 may be a satellite, base station, a Node B, an evolved Node B (eNB), 5G Node B or access point, next generation Node B (NG-NB or gNB), and/or WLAN access point, associated with a radio access network (RAN), such as an LTE network, 5G or NR. According to certain embodiments, apparatus 20 may be controlled by memory 24 and processor 22 to perform the functions associated with any of the embodiments described herein.

For instance, in one embodiment, apparatus 20 may be controlled by memory 24 and processor 22 to determine a phase tracking reference signal configuration for at least one single carrier symbol. Apparatus 20 may also be controlled by memory 24 and processor 22 to send the phase tracking reference signal configuration to a user equipment via a related radio resource control signaling and/or scheduling information. Apparatus 20 may further be controlled by memory 24 and processor 22 to carry out a multiport radio transmission or reception with the user equipment according to the phase tracking reference signal configuration. In an example embodiment, the phase tracking reference signal configuration may be defined according to a transmission rank. In another example embodiment, the phase tracking reference signal configuration may include M groups of modulation symbols, each group comprising N modulation symbols.

Further example embodiments may provide means for performing any of the functions, steps, or procedures described herein. For example, one example embodiment may be directed to an apparatus that includes means for receiving a radio resource control signaling and/or scheduling information from a network element. The apparatus may also include means for determining a phase tracking reference signal configuration based on the radio resource control signaling and/or scheduling information. The apparatus may further include means for carrying out a multiport radio reception or transmission with the network element according to the determined phase tracking reference signal configuration. In addition, the apparatus may include means for receiving an indication of a local or partially local oscillator architecture of the network element. The apparatus may also include means for combining the received phase tracking reference signal configuration via different antenna ports based on the local oscillator architecture when a local oscillator architecture or partially local oscillator architecture is used so that some ports have similar phase noise.

Another example embodiment may be directed to an apparatus that includes means for determining a phase tracking reference signal configuration for at least one single carrier symbol. The apparatus may also include means for sending the phase tracking reference signal configuration to a user equipment via a related radio resource control signaling and/or scheduling information. The apparatus may further include means for carrying out a multiport radio transmission or reception with the user equipment according to the phase tracking reference signal configuration. In an example embodiment, the phase tracking reference signal configuration may be defined according to a transmission rank. In another example embodiment, the phase tracking reference signal configuration may include M groups of modulation symbols, each group comprising N modulation symbols.

Certain example embodiments described herein provide several technical improvements, enhancements, and/or advantages. In some example embodiments, it may be possible to effectively operate a system that is greater than 52.6 GHz. In particular, it may be possible to effectively operate such system with multiple SCSs/MCSs, QoS level, and bandwidths without significant signaling overhead, receiver complexity, or testing efforts. Certain example embodiments may also scale to scenarios with rank>1, and certain example embodiments may provide a solution that does not increase PAPR/cubic metric (CM). According to other example embodiments, it may be possible to optimize link performance for different scenarios (e.g., different SCS, different Rank, different propagation conditions, and different services (e.g., eMBB and URLLC)). For example, based on e.g., rank, SCSs/MCSs, QoS level, bandwidths and employed local oscillators, the method may provide an optimized performance so that the impact of phase noise is minimized and the, for example, throughput or coverage is maximized. In addition, this may be done with minimum signaling overhead to the system, and without extra complexity in the network elements. Certain example embodiments may also provide a solution that enables dimensioning the PTRS according to actual scenarios, not according to the worst-case scenario.

A computer program product may include one or more computer-executable components which, when the program is run, are configured to carry out some example embodiments. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

| Partial Glossary | |
|---|---|
| AL | Aggregation Level |
| CP-OFDM | Cyclic Prefix OFDM |
| DFT | Discrete Fourier Transformation |
| DFT-S-OFDM | DFT Spread OFDM |
| DL | Downlink |
| eNB | Enhanced Node B |
| FDM | Frequency Division Multiplex |
| FFT | Fast Fourier Transform |
| gNB | 5G or Next Generation NodeB |
| IFFT | Inverse Fast Fourier Transformation |
| LO | Local Oscillator |
| LTE | Long Term Evolution |
| MCS | Modulation and Coding Scheme |
| nPRB | Number of Physical Resource Blocks |
| NR | New Radio |
| OFDM | Orthogonal Frequency Division Multiplexing |
| PA | Power Amplifier |
| PAPR | Peak-to-Average Power Ratio |
| PDCCH | Physical Downlink Control Channel |
| PDSCH | Physical Downlink Shared Channel |
| PN | Phase Noise |
| PRB | Physical Resource Block |
| PTRS | Phase Tracking Reference Signal |
| PUSCH | Physical Uplink Shared Channel |
| QoS | Quality of Service |
| RE | Resource Element |
| REG | Resource Element Group |
| RF | Radio Frequency |
| Rx | Receiver |
| SC | Single Carrier |
| SCS | Sub-Carrier Spacing |
| SSB | Synchronization Signal Block |
| TDM | Time Division Multiplex |
| Tx | Transmitter |
| UE | User Equipment |
| UL | Uplink |

The invention claimed is:

1. An apparatus comprising:
   at least one processor; and
   at least one memory comprising computer program code,
   the at least one memory and computer program code are configured, with the at least one processor, to cause the apparatus at least to:
   determine a phase tracking reference signal configuration for at least one single carrier symbol;
   send the phase tracking reference signal configuration to a user equipment via a related radio resource control signaling and/or scheduling information; and
   carry out a multiport radio transmission or reception with the user equipment according to the phase tracking reference signal configuration,
   wherein the phase tracking reference signal configuration is defined according to a maximum transmission rank,
   wherein the phase tracking reference signal configuration comprises M groups of modulation symbols, each group comprising N modulation symbols;
   wherein the parameter N is determined in a manner supporting code division multiplexing of phase tracking reference signal antenna ports according to the maximum transmission rank, and wherein the groups of modulation symbols (M) is increased with the increasing maximum transmission rank.

2. The apparatus according to claim 1, wherein the code division multiplexing is carried out by means of spatial layer-specific Hadamard code.

3. An apparatus comprising:
at least one processor; and
at least one memory comprising computer program code,
the at least one memory and computer program code are configured, with the at least one processor, to cause the apparatus at least to:
determine a phase tracking reference signal configuration for at least one single carrier symbol;
send the phase tracking reference signal configuration to a user equipment via a related radio resource control signaling and/or scheduling information; and
carry out a multiport radio transmission or reception with the user equipment according to the phase tracking reference signal configuration,
wherein the phase tracking reference signal configuration is defined according to a maximum transmission rank,
wherein the phase tracking reference signal configuration comprises M groups of modulation symbols, each group comprising N modulation symbols; and
wherein the relationship between the maximum transmission rank and N is:

if the maximum transmission rank equals 1, N is an integer,
if the maximum transmission rank equals 2, N is a multiple of 2, and
if the maximum transmission rank equals 4, N is a multiple of 4.

4. An apparatus comprising:
at least one processor; and
at least one memory comprising computer program code,
the at least one memory and computer program code are configured, with the at least one processor, to cause the apparatus at least to:
determine a phase tracking reference signal configuration for at least one single carrier symbol;
send the phase tracking reference signal configuration to a user equipment via a related radio resource control signaling and/or scheduling information; and
carry out a multiport radio transmission or reception with the user equipment according to the phase tracking reference signal configuration,
wherein the phase tracking reference signal configuration is defined according to a maximum transmission rank,
wherein the phase tracking reference signal configuration comprises M groups of modulation symbols, each group comprising N modulation symbols; and
wherein dimensioning for parameter M is made such that a number of bits per modulation symbol is kept constant per configuration.

* * * * *